T. SUSEMIHL & C. P. CARRINGTON.

UMBRELLA.

APPLICATION FILED MAY 11, 1912.

Reissued June 18, 1912.

13,430.

2 SHEETS—SHEET 1.

WITNESSES

H. D. Walker

L. J. Gallagher

INVENTORS:

Theodor Susemihl

Charles P. Carrington

BY

Munn & Co.

ATTORNEYS

COLUMBIA PLANOGRAPH CO., WASHINGTON, D. C.

T. SUSEMIHL & C. P. CARRINGTON.

UMBRELLA.

APPLICATION FILED MAY 11, 1912.

Reissued June 18, 1912.

13,430.

2 SHEETS—SHEET 2.

WITNESSES

A. J. Walker

L. J. Gallagher

INVENTORS:

Theodor Susemihl

Charles P. Carrington

BY

Munn & Co

ATTORNEYS

COLUMBIA PLANOGRAPH CO., WASHINGTON, D. C.

UNITED STATES PATENT OFFICE.

THEODOR SUSEMIHL AND CHARLES P. CARRINGTON, OF NEW YORK, N. Y.

UMBRELLA.

13,430. Specification of Reissued Letters Patent. Reissued June 18, 1912.

Original application filed November 26, 1910, Serial No. 594,294. Renewed November 7, 1911, Serial No. 659,058. Original No. 1,024,292, dated April 23, 1912. Application for reissue filed May 11, 1912. Serial No. 696,821.

*To all whom it may concern:*

Be it known that we, THEODOR SUSEMIHL, a subject of the German Emperor, and CHARLES P. CARRINGTON, a citizen of the United States, and both residents of the city of New York, borough of Brooklyn, in the county of Kings and State of New York, have invented a new and Improved Umbrella, of which the following is a full, clear, and exact description.

Our invention relates to umbrellas, our more particular purpose being to provide the umbrella with improved means whereby it may be disassembled and compacted into a small space and carried, if desired, in a small case for the purpose.

Our invention further comprehends an umbrella which, when spread open and in active use, may assume two distinct forms suitable for use under different weather conditions.

Our invention further includes various mechanical changes whereby the efficiency of the umbrella is greatly increased.

Reference is to be had to the accompanying drawings forming a part of this specification, in which similar characters of reference indicate corresponding parts in all the figures.

Figure 1:
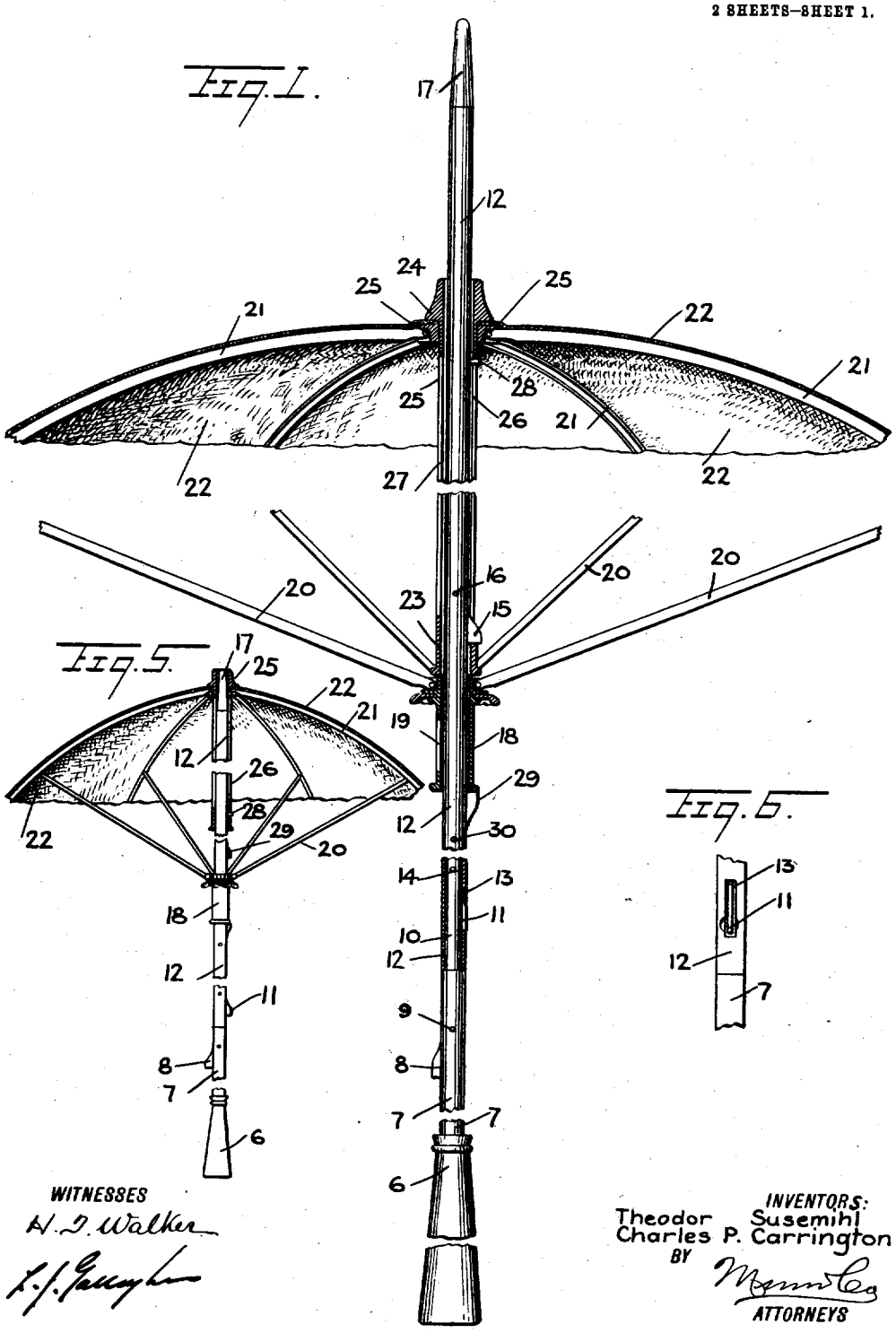
Figure 2:
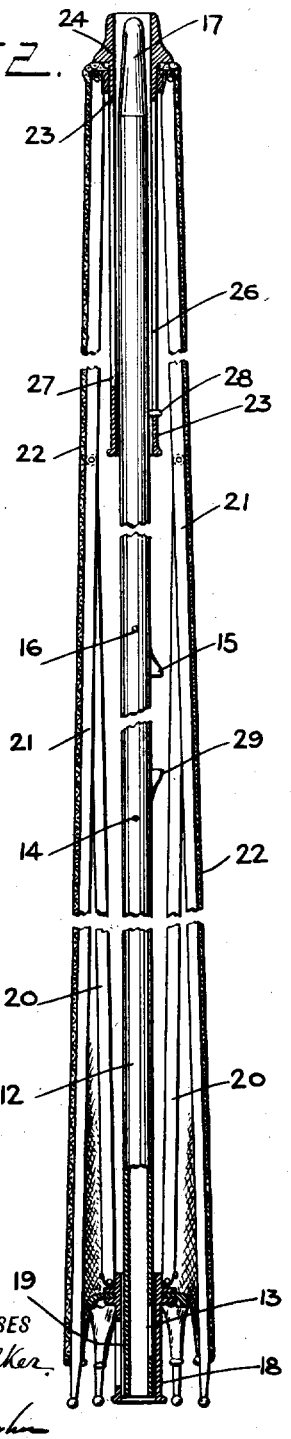
Figure 3:
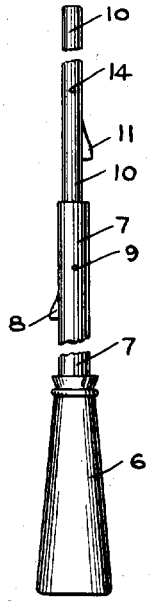
Figure 4:
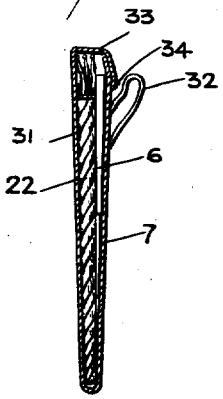

Figure 1 is a view partly in section and partly in elevation showing our improved umbrella spread open and ready for use and having one of its distinct shapes for this purpose; Fig. 2 shows the umbrella, with the exception of the handle, when folded up and ready to be carried in the pocket or placed in a case, as desired; Fig. 3 is a detail showing the detachable handle and parts immediately associated therewith; Fig. 4 is a section showing the umbrella complete as folded and packed in its case; Fig. 5 is a view somewhat similar to Fig. 1, showing the umbrella unfolded and ready for use, but occupying a different position from that indicated in Fig. 1; and Fig. 6 is a detail of the fastening employed for detachably holding together the handle and the body portion of the staff.

The handle of the umbrella is shown at 6 and is provided with a stem 7, this stem being generally of tubular form and provided with a latch 8, the latter being mounted upon a pivot 9 which extends diametrically through the stem 7. The latch 8 may be pressed inward—that is, toward the center of the stem 7. The stem 7 is provided with a tubular portion 10 concentric to the body portion of the stem and provided with a latch 11.

The staff of the umbrella is shown at 12 and has generally a tubular form; it is provided with a slot 13. The latch 11 carried by the tubular portion 10 is adapted to extend through the slot 13, as indicated in Fig. 1, thus holding the stem 7 and the staff 12 temporarily together. The latch 11 is mounted upon a pivot 14, which extends diametrically through the portion 10. The staff 12 is provided with a latch 15 which is mounted upon a pivot 16, the latter extending diametrically through the staff. Mounted upon one end of the staff 12 is a ferrule or tip 17 which may be of the ordinary type.

At 18 is a runner having generally a tubular form and of proper diameter to loosely encircle the staff 12. This runner is provided with a slot 19 which is of such size that the latch 8 can readily extend outwardly through it.

A number of stays are shown at 20, being pivotally connected with the upper end of the runner 18 and radiating outwardly therefrom, each stay being movable in a plane coinciding in direction with the general length of the runner and also with the general direction in which it travels.

Ribs are shown at 21 and are pivotally connected with the stays 20.

At 22 is a cover made of cloth or the like and having generally a dome-like form.

A sleeve 23 considerably longer than the runner 18 loosely encircles the staff 12. This sleeve at its upper end is provided with an annular bead 24, and immediately adjacent to this bead are a number of pivot bearings 25 carried by the sleeve, the ribs 21 radiating from these bearings. The sleeve 23 is provided with a slot 26 which is in alinement with the latch 15, so that the latch is adapted to extend outwardly through the slot as indicated in Fig. 1. The sleeve 23 is further provided with a number of other slots 27, these last-mentioned slots being used for the purpose of lightening the sleeve and reducing its cost of manufacture.

At 28 is a pin which extends radially into the staff 12 and is fixed in position. This pin extends through the slot 26 and limits the travel of the sleeve 23 which is slidable relatively to the staff. If the sleeve 23 be drawn downwardly according to Fig. 1, so that the latch 15 springs outward and extends through the lower part of the slot 26, the pin 28 will necessarily be in the upper portion of this slot, and the pin 28 and the latch 15 will, for the time being, hold the sleeve 23 tolerably rigid in relation to the staff. If, however, the pressure of the finger be applied to the latch 15, so as to force it inwardly through the slot 26 and thus release the sleeve 23, the latter may move upwardly until the lower end of the slot 26 lodges against the under side of the pin 28. In this event the upper end of the sleeve 23 becomes substantially flush with the upper portion of the tip or ferrule 17, as will be understood from Fig. 5. If, now, the operator merely grasps the upper end of the sleeve 24 and presses it downwardly according to Fig. 5, the latch 15 again springs outwardly and protrudes through the slot 26, thus holding the sleeve 23 in the position indicated in Fig. 1.

Where the parts occupy the positions indicated in Fig. 5, as just described, the umbrella is suitable for use in a violent storm or under conditions where the rainfall is excessive. The slope given to the cover 22 is now very great, the drift of the rain is rendered comparatively steep, and the efficiency of the umbrella is greatly increased for the purpose here in view. If there be a high wind and it is difficult to hold the umbrella, it is apparent that the increased slope given to the umbrella cover, as indicated in Fig. 5, is beneficial in dividing the wind and in preventing the umbrella from becoming unmanageable. Moreover, with the parts in the position indicated in Fig. 5, the bracing of the ribs by aid of the stays is more perfectly accomplished, because the stays meet the ribs at an angle more nearly approximately a right angle than would ordinarily be the case. The pressure upon the stays 20 is therefore practically "end on" and the strength of the umbrella is for the time being greatly increased. Under ordinary conditions, however, it is desirable that the umbrella be so carried that the various parts will have the respective positions indicated in Fig. 1. For this purpose the sleeve 23 is pushed or drawn downwardly according to Fig. 1, so that the latch 15 protrudes through the bottom of the slot 26, as above described. This being done the use of the umbrella is not greatly different from that of any umbrella ordinarily employed, the curvature of the ribs being greater than when the umbrella is used as in Fig. 5.

The handle 6 and stem 7 are easily detached from the staff 12 by merely pressing the latch 11 inwardly. This being done, the handle is simply pulled away from the staff and then appears substantially as indicated in Fig. 3.

At 29 is a latch which is mounted upon a pivot pin 30, the latter extending diametrically through the stem 12. The purpose of the latch 29 is to hold the runner 18 in the position indicated in Fig. 1, or that shown in Fig. 5. To let the umbrella down, the operator presses his finger against the latch 29. This releases the runner 18 and allows the same to move slidably down the staff 12 and over the adjacent portion of the stem 7. The runner 18 being thus moved downwardly to its limit of travel, the latch 8 protrudes outwardly through the slot 19 and thus prevents the runner 18 from moving back.

It will be noted that the latch 11 does not protrude as far as the other latches shown. This is because the latch 11 should not be an obstacle to the travel of the runner 18. That is to say, the runner 18 should be free to pass entirely over and beyond the latch 11 in two directions, and in doing so, should never catch upon the latch in question or force it inwardly so as to release the stem 7 from the staff 12. For this purpose we practically sink the latch 11 deeper than the other latches and in order to enable the operator to reach and press the latch notwithstanding its sunken position, we make the slot 13 of the conformity indicated in Fig. 6—that is to say, very wide at its middle portion in order to allow for the operator's thumb or finger.

At 31 (Fig. 4) we show a small packing case into which the separate parts of the umbrella are placed. In order to facilitate carrying the case, it is provided with a handle 32; it is also provided with a flap or closure member 33 and with a clasp 34 for holding this flap or closure member in closed or normal position, as indicated in Fig. 4.

The operation of our device is as follows: Suppose that the parts are in the case, as indicated in Fig. 4. The operator releases the clasp 34, forces back the flap or closure member 33 and takes out the different portions of the umbrella. These are two in number and appear substantially as indicated in Figs. 2 and 3. The operator next inserts the reduced portion 10 of the stem 7 into the open end of the staff 12, so that the latch 11 protrudes outwardly through the slot 13. This being done, the umbrella is next raised into either one or the other of the two positions indicated in Figs. 1 and 5—the particular position chosen depending upon the relative position which the operator chooses to give the sleeve 23. Suppose, now, that the parts are employed in the ordinary manner and as indicated in Fig. 1, and that the operator wishes to close the umbrella. To do this, he presses upon the latch 29. The runner 18 thereupon slides down the staff 12, passes idly over the latch 11 and engages with the latch 8 which, as above explained, now protrudes outwardly through the slot 19. The downward movement of the runner 18 relaxes the pressure of the stays 20 against the ribs, and the latter collapse. Suppose, however, that the umbrella is being used as indicated in Fig. 5 and is to be lowered. In this instance, as before, the operator presses upon the latch 29 and thus releases the runner 18 which slides down that staff as before. The relaxation of the pressure of the stays 20 against the ribs 21 allows the sleeve 23 to move downwardly in relation to the staff. The sleeve 23 is thus rendered free and consequently slides to the limit of its travel down the staff 12; that is to say, until the upper end of the slot 26 is occupied by the pin 28.

The umbrella above described may be made in a great variety of materials and its various parts may be made light or heavy as desired. It is of peculiar service as a shopping umbrella employed by ladies having much of this sort of work to do. We do not limit ourselves, therefore, to any particular materials, sizes or proportions of the various parts. Neither do we limit ourselves to any particular purpose for which the umbrella may be employed.

Having thus described our invention, we claim as new and desire to secure by Letters Patent:

An umbrella, comprising a staff, a sleeve slidably mounted thereupon and provided with a slot, a pin mounted upon said staff and extending through said slot for limiting the travel in one direction of said sleeve on said staff, a latch mounted upon said staff and disposed in registry with said slot for the purpose of extending therethrough in order to limit the travel of said sleeve in a direction opposite the direction of travel first mentioned, a runner slidably mounted upon said staff and adapted to engage the adjacent end of said sleeve, another latch mounted upon said staff for normally preventing said runner from moving away from said sleeve, ribs pivotally connected with said sleeve, stays pivotally connected with said runner and with said ribs, and a cover mounted upon said ribs.

In testimony whereof we have signed our names to this specification in the presence of two subscribing witnesses.

THEODOR SUSEMIHL.
CHARLES P. CARRINGTON.

Witnesses:
RICHARD L. SUSEMIHL,
JOHN E. TWEED.

Copies of this patent may be obtained for five cents each, by addressing the "Commissioner of Patents, Washington, D. C."